United States Patent [19]

Denis et al.

[11] Patent Number: 4,660,924
[45] Date of Patent: Apr. 28, 1987

[54] DEVICE FOR OBSERVING THE TUBE PLATE OF A STEAM GENERATOR

[75] Inventors: Jean Denis, Maisons Laffitte; Poirier Pierre, Stains, both of France

[73] Assignee: Electricite de France, France

[21] Appl. No.: 606,253

[22] Filed: May 2, 1984

[30] Foreign Application Priority Data

May 4, 1983 [FR] France ................................. 83 07459

[51] Int. Cl.⁴ ............................................. G02B 6/12
[52] U.S. Cl. ................................................. 350/96.10
[58] Field of Search ............... 350/96.10, 96.24, 96.25, 350/96.26, 573, 618, 623

[56] References Cited

U.S. PATENT DOCUMENTS

| | | | |
|---|---|---|---|
| 3,262,364 | 7/1966 | Kollmorgen | 350/623 |
| 4,015,120 | 3/1977 | Cole | 350/618 X |
| 4,444,462 | 4/1984 | Ono et al. | 350/96.26 X |
| 4,480,895 | 11/1984 | Carson | 350/623 |

Primary Examiner—William L. Sikes
Assistant Examiner—Akm E. Ullah
Attorney, Agent, or Firm—Larson and Taylor

[57] ABSTRACT

The device is suitable for use in inspecting the tubular plate of a steam generator, for instance of a PWR, comprising parallel banks of tubes contained in an enclosure having at least one access hole situated opposite an interval between two adjacent ones of said banks, the device comprises an elongated hollow member having a cross section whose transversal size is less than the interval for insertion into the enclosure through the access hole. A light guide and an endoscope are located inside and along said hollow member, with the endoscope being under the light guide; first and second light deflection mirrors are associated with the guide and endoscope for scanning purpose. A fixed lighting source illuminates the zone in which the light beam from the first deflection mirror is cut by the second deflection mirror.

5 Claims, 4 Drawing Figures

DEVICE FOR OBSERVING THE TUBE PLATE OF A STEAM GENERATOR

BACKGROUND AND SUMMARY OF THE INVENTION

The invention relates to a device for observing the tube plate of a steam generator comprising parallel banks of tubes situated in an enclosure having at least one access situated opposite an interval between two adjacent banks, said device comprising an elongated member having a cross section whose transversal size is less than the width of the interval, insertable through the access and containing light guide means and an endoscope and finishing in a head provided with orientatable light deflection means associated with the endoscope and with the light guide means for illuminating and observing a same zone of the plate.

The invention is particularly (though not exclusively) suitable for visual inspection of the tube plate of steam generators used in PWR nuclear generating stations. For safety in use of the generating station, there should be no leak of the primary fluid, which flows along the tubes, into the secondary fluid which flows through the space defined by the tubes and the casing of the steam generator. Observation of the tubular plate on the secondary side of the steam generator supplies indications useful for operation and for safety and in particular makes it possible to monitor the condition of the base of the tubes of the bundle through which the primary fluid flows, the nature, the color and the location of oxides and sludge deposits and the presence of possible foreign bodies.

Visual observation devices of the above defined kind have already been constructed. In one type of steam generator frequently used in nuclear power stations, the enclosure is provided with different accesses; some of them, generally called "eye holes", are placed at a small distance from the tube plate, opposite the interval between two banks of tubes. A pole constituting the elongated member of the device may be introduced through the eyehole, between two adjacent tube banks, which allows the observation to be carried out at a distance and so prevents the operators from being exposed to radiation. The pole is stopped in successive positions in which the deflector means of the head are situated between two adjacent rows of tubes and the observation is carried out by scanning with the deflection means.

But, because of the small spacing between two adjacent rows of tubes, it is impossible to align the deflector means of the endoscope and of the light guide in the insertion direction. So as to keep nevertheless the possibility of effecting an observation directly under the endoscope, it has been proposed to place the orientatable deflector means of the light guide at the end of a laterally projecting light deflection tube. But this solution presents serious drawbacks. The lateral tube must be brought into a vertical position before the pole is moved and any oversight may damage the device, even cause the projecting part to fall into the steam generator; and it is not possible to observe both sides of the pole with a same instrument.

It is an object of the invention to provide an improved observation device; it is a more particular object to provide a device which makes it possible to observe the tubular plate on both sides of the elongated member while avoiding the presence of members beyond the width of the interval between adjacent banks.

For that purpose, the device has light deflecting means disposed within the cross-section of elongated member, substantially one above the other; the light deflection means are at a distance from the plate greater than the deflection means of the endoscope and the device further includes a fixed light guide for illuminating the zone of the plate in which the light beam coming from the deflection means of the light guide is cut by the deflection means of the endoscope.

The invention will be better understood from the following description of a particular embodiment of the invention and from the comparison thereof with a device of the prior art.

SHORT DESCRIPTION OF THE DRAWINGS

DETAILED DESCRIPTION OF A PREFERRED EMBODIMENT

Figure 1:
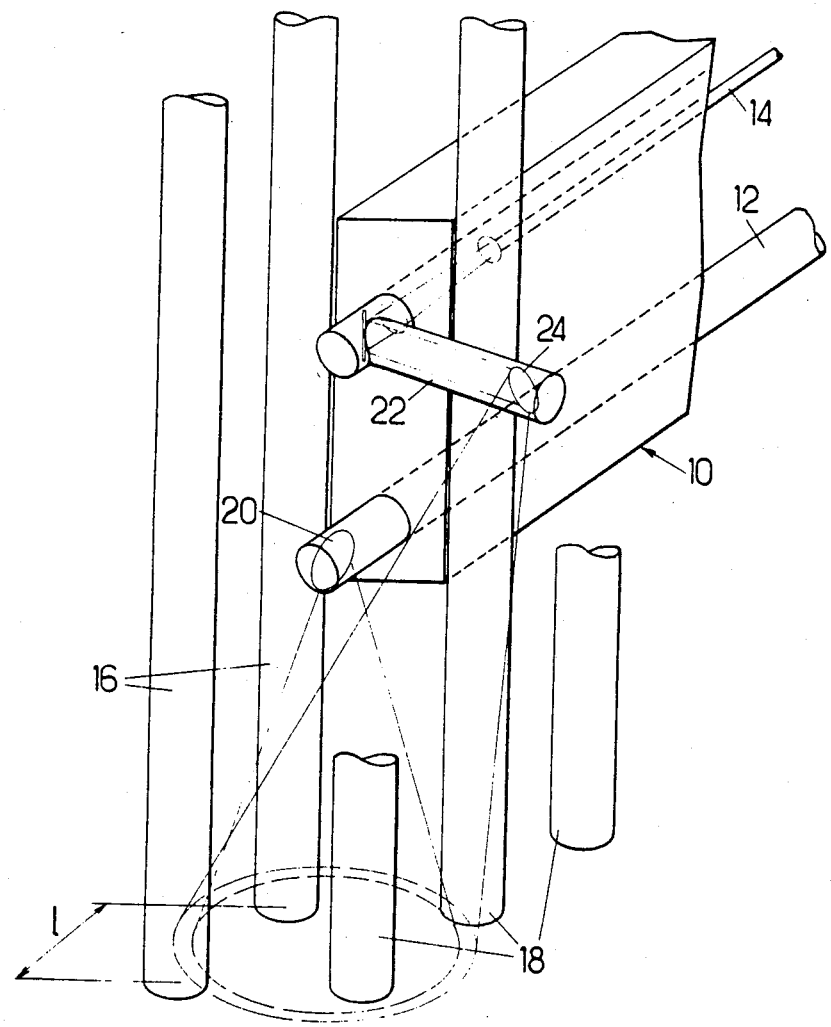
FIG. 1 is an isometric and diagrammatic view showing the head of a device of the prior art.

Referring to FIG. 1, a prior art device comprises a rigid elongated member 10 in the form of a hollow pole of rectangular cross section; a rigid endoscope 13 is located along the pole and a light guide 14 formed by an optical fiber is located above the endoscope and parallel thereto. The endoscope 12 and fiber 14 cooperate respectively with an eyepiece or a video camera and with a light source (not shown) which are located at the end of the pole remote from the end to be introduced in the enclosure of a steam generator to be inspected. The pole is of sufficiently small cross section for being introduced through an eyehole, between two adjacent banks of tubes 16 and 18. For that, the width of the pole must not exceed the dimension of the interval between adjacent tubes. A typical device includes a pole whose cross section has a width of 8 mm and a height of 30 mm. The distal end of endoscope 12 includes means for changing the observing direction comprising a mirror 20 angularly movable about the axis of the endoscope, placed in the lower part of pole 10. When the pole is in a position in which the mirror is opposite the space, of width l, between two adjacent tubes, all parts of the plate in a zone transversal to the pole can be observed successively, provided that the zone receives light. Now, the interval between adjacent heat exchange tubes is too small for accomodating the light deflection means of the endoscope and of the light guide in aligned condition. The deflection means are therefore at different levels. To avoid that the end part of the endoscope obstructs the light path during vertical observation, the deflection means of the light guide comprise a lateral tube 22 comprising a mirror 24 for offsetting the light path.

Figure 2:
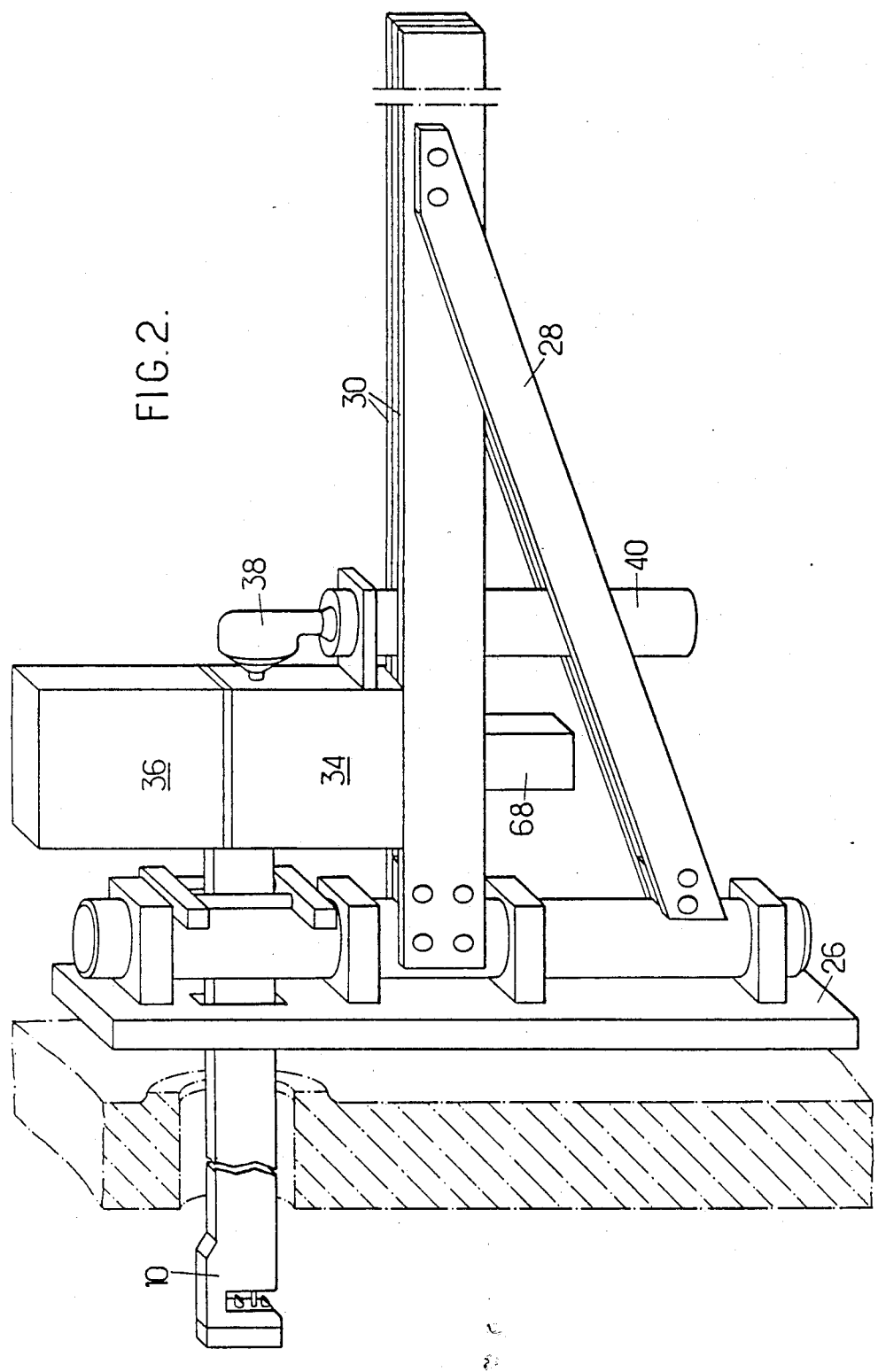
FIG. 2 is an overall isometric view showing the general construction of a device according to the invention.
Figure 3:
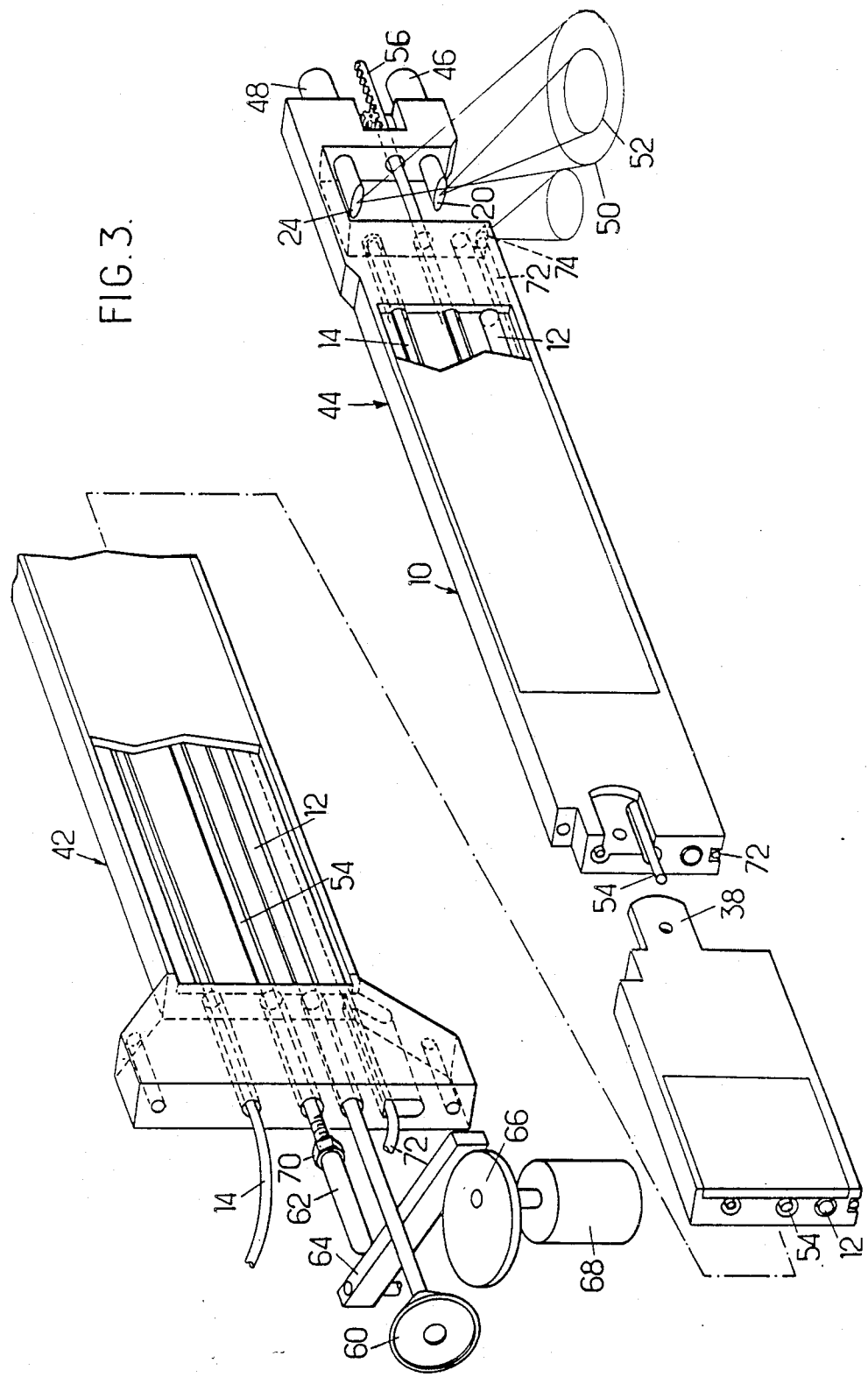
FIGS. 3 and 4 are isometric views showing the construction of a pole insertable in the heat exchanger.

As mentioned above, that design has drawbacks which are overcome by the invention, which will now be described with reference to FIGS. 2 and 3 in which the parts corresponding to those in FIG. 1 are designated by the same reference number.

Pole 10, again consisting of a hollow elongated member of rectangular cross section, is formed from several mutually assembled parts. Longitudinal movements of the pole are controlled by a mechanism placed outside the enclosure of the steam generator, between the enclosure of this generator and the protecting shield in the case of a nuclear power station. Referring to FIG. 2, the mechanism may comprise a base member 26 on which is mounted a bracket 28 having horizontal guide rails 30 at its upper part. A drive motor actuates, through a transmission in a case 34 which may be of a conventional type, rollers for driving a movable assembly along rails 30 parallel to the rod. The movable assembly comprises, in addition to case 34, the motor and pole 10, a lighting assembly comprising a light box 36 having a source such as an arc lamp and an optical connecting member 38. As illustrated, member 38 is an adaptor for connection with a video camera 40. In other cases, it may be formed by an eye piece for direct visual observation and inspection.

The pole 10 (FIG. 3) comprises a rear part 42 and a front part 44 connected to each other by junction means ensuring continuity of the optical paths. Several front parts of different lengths may be made available for rendering it possible to inspect the inside of a steam generator throughout its width, although there is a restricted space available between the case and the shield which surrounds it. The rear part is supported by case 34. The front part constitutes an exploration head provided with scanning means.

Figure 4:
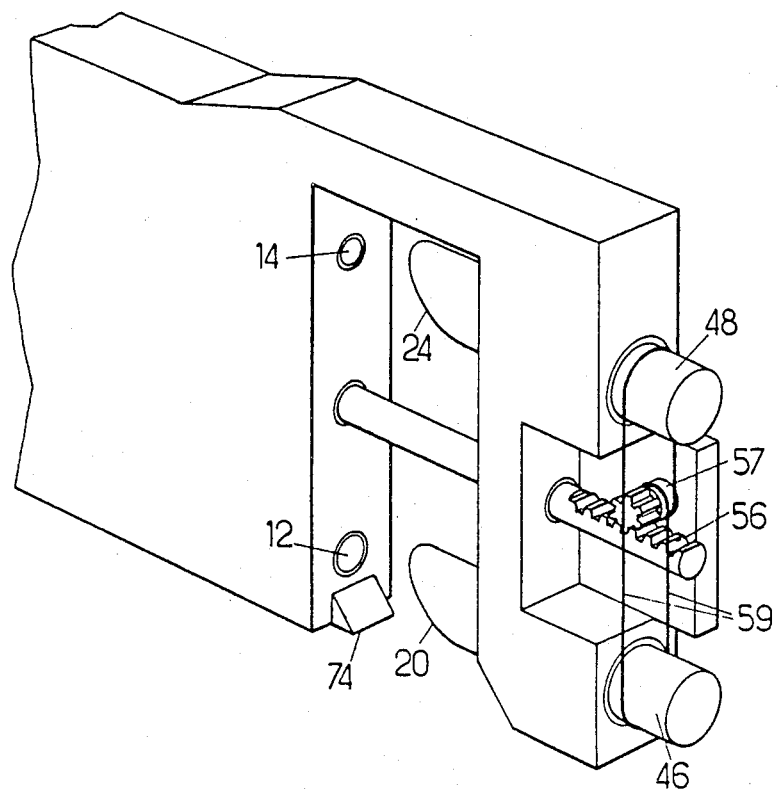

The head of the device of the invention, in which the parts corresponding to those in FIG. 1 are designated by the same reference numbers, again accomodates an endoscope 12 and an optical fiber 14, each associated with a mirror 20 or 24 for deflecting light. The head is U shaped with the opening of the U directed downwards. The mirror 20 of the endoscope is carried by a drum 46 mounted in the distal leg of the U for rotation about an axis parallel to the axis of pole 10. The mirror 24 associated with the light guide 14 is placed above mirror 20 thereby removing the need for a laterally directed tube. Drums 46 and 48 may be controlled simultaneously so that there is overlapping of the illuminated zone 50 and the zone 52 seen by the endoscope by a mechanism located in the pole. In the embodiment shown in FIG. 3, the mechanism comprises a longitudinally slidable rod 54 having an end rack 56 for driving a set of gears coupled with drums 46 and 48, for example by means of a drum 57 and belt 59 (FIG. 4).

The rod 54 is in two sections. The front section is located along part 44 and projects rearwardly therefrom into engagement with the section contained in the rear part 42.

The rear part 42 is formed for connection with the front part 44. It has a finger 38 engaging in a slot of corresponding shape for alignment. Screws (not shown) may be used for securing the parts to each other. The rear part accomodates rear parts of the endoscope 12, of the light guide 14 and of rod 54. As shown in FIG. 3, the endoscope terminates in an eye piece 60. The end of rod 54 extends rearwardly of part 42 and has an end nipple 62 which a return spring (not shown) tends to urge against a rocking lever 64 abutting a cam 66 actuated by a motor 68. A nut 70 may be provided for forming an adjustable stop, limiting the movements of the rack.

Since drums 46 and mirror 20 cut off the light beam supplied by mirror 24 during observation straight under the pole, the latter contains fixed means for illuminating the zone within the shadow. As shown, such means comprise a light guide 72 provided in the lower part of the pole, provided with an end mirror 74 reflecting light in a different direction. The second guide may be supplied from the same light source 36 as the first one; the two guides may be lighted simultaneously in alternance.

By way of example, it may be mentioned that a device used for inspecting the tube plate of nuclear power station steam generators comprises a pole whose rear part is about 1 meter long and two front parts useable alternately, whose lengths are 30 cm and 1 meter. The width of the pole is of from 7 to 8 mm; the pole may then be inserted easily between two adjacent banks of tubes. With a height of 30 mm, sufficient rigidity is obtained. The light guides are formed by optical fibers. The endoscope is formed by a tube containing the optical system and is slidably received in the pole.

Operation of the device appears from the description and it is then sufficient to consider it briefly. The pole is introduced into one of the eye holes of the steam generator, between two banks of adjacent tubes, then stopped in a position in which mirrors 24 and 20 are in a gap between two adjacent rows. By rotating the mirrors, the feet of the tubes and the plate can be inspected over a whole row. It should however be noted in passing that the field of view of the endoscope will always be small, about 10% in general, so that a high degree accuracy in the synchronization of mirrors 20 and 24 is required. Once synchronization of mirrors 20 and 24 is required. Once one row has been inspected, the pole is advanced over a distance equal to the interval between two banks and the sequence of operations is resumed.

The whole of the operations may be remotely controlled so as to reduce the irradiation undergone by the operator, the movements being reproduced on a display.

We claim:

1. A device for optically inspecting a tubular plate of a steam generator having an enclosure formed with an access hole confronting an interval between two parallel banks of vertical tubes and formed above the tubular plate, the device comprising:
   a hollow member elongated in a horizontal direction, having a horizontal lateral dimension whose size is less than the interval and an overall cross-section smaller than that of the access hole, said hollow member having a main part and a distal end part in mutual alignment along the direction of elongation;
   light guide means located inside said main part for directing light along the direction of elongation;
   an endoscope located inside said main part substantially parallel to and under said light guide means;
   first light deflection means carried by said distal end part in alignment with said light guide means and mounted for angular adjustment about an axis parallel to the direction of elongation for deflecting and directing a light beam from said light guide means in a controllable direction about the direction of elongation, said first light detection means having a small lateral dimension whereby during rotation about the direction of elongation said first light detection means is maintained within the overall cross-section of said hollow member;
   second light deflection means carried by said distal end part in alignment with said endoscope and arranged for deflecting and directing the line of sight of said endoscope in a controllable direction about said direction of elongation, said second light detection means having a small lateral dimension whereby during rotation about the direction of elongation said second light detection means is maintained within the overall cross-section of said hollow member;

control means for simultaneous angular control of said first and second light deflection means about said direction of elongation while both said light deflection means are maintained within a volume defined by the overall cross-section of said hollow member; and fixed lighting means carried by said main part and arranged for illuminating a zone under said second light deflection means where the light beam from the first deflection means is interrupted by the second deflection means, whereby inspection of said tubular plate is possible throughout a continuous angular range extending from one side to the other of said device.

2. A device according to claim 1, wherein said first and second light deflection means comprise respective mirrors carried by means rotatable within said elongated member about parallel axes and driven in synchronism by the control means.

3. A device according to claim 1, wherein the control means includes a rod located along and within said elongated member, projecting from an end of said elongated member remote from said light deflection means, mounted for longitudinal sliding movement along said elongated member and operatively associated with both said light deflection means.

4. A device according to claim 1, wherein said elongated member comprises at least a front section and a rear section connectable in end to end relation.

5. A device according to claim 1, wherein said fixed lighting means comprises an optical fiber located under said endoscope and parallel thereto, and a fixed light deflection means.

* * * * *